No. 648,126. Patented Apr. 24, 1900.
R. HENNING & J. PALLWEBER.
CASH REGISTER OR ADDING MACHINE.
(Application filed Mar. 5, 1897.)

(No Model.) 8 Sheets—Sheet 3.

Witnesses
John Kehlenbeck.

Inventors
Richard Henning
Joseph Pallweber
By Briesen & Knauth
Attorneys.

THE NORRIS PETERS CO., PHOTO-LITHO., WASHINGTON, D. C.

No. 648,126. Patented Apr. 24, 1900.
R. HENNING & J. PALLWEBER.
CASH REGISTER OR ADDING MACHINE.
(Application filed Mar. 5, 1897.)
(No Model.) 8 Sheets—Sheet 5.

Fig: 3.

No. 648,126. Patented Apr. 24, 1900.
R. HENNING & J. PALLWEBER.
CASH REGISTER OR ADDING MACHINE.
(Application filed Mar. 5, 1897.)
(No Model.) 8 Sheets—Sheet 6.

Fig: 4.

Witnesses
Inventors
Richard Henning
Joseph Pallweber
By Briesen & Knauth
Attorneys.

No. 648,126. Patented Apr. 24, 1900.
R. HENNING & J. PALLWEBER.
CASH REGISTER OR ADDING MACHINE.
(Application filed Mar. 5, 1897.)
(No Model.) 8 Sheets—Sheet 7.

United States Patent Office.

RICHARD HENNING AND JOSEPH PALLWEBER, OF FRANKFORT-ON-THE-MAIN, GERMANY, ASSIGNORS TO SAID HENNING AND ADOLF KOLBE, OF SAME PLACE.

CASH-REGISTER OR ADDING-MACHINE.

SPECIFICATION forming part of Letters Patent No. 648,126, dated April 24, 1900.

Application filed March 5, 1897. Serial No. 626,072. (No model.)

*To all whom it may concern:*

Be it known that we, RICHARD HENNING and JOSEPH PALLWEBER, residing at Frankfort-on-the-Main, Germany, have invented certain new and useful Improvements in Keyboard Indicating Mechanism for Cash-Registers, Adding-Machines, &c., of which the following is a specification, and for which we have obtained Letters Patent in France, No. 260,453, dated January 25, 1897, and in Belgium, No. 124,330, dated November 16, 1896.

This invention has for its object an arrangement whereby it is possible by the use of a row of keys to exhibit a given number and simultaneously to add together the separate figures which have thus become visible.

In the accompanying drawings a constructional form of the apparatus is shown by way of example as it is preferably applied to check-tills in those countries in which the decimal monetary system is in use. If the till be designed for use in a country which does not employ the decimal system, the key rows, number-wheels, and adding mechanism must of course be otherwise divided to correspond to the respective monetary system.

In the drawings, Figs. 1$^a$ and 1$^b$ show a longitudinal section of the apparatus broken in two for the purposes of clearer illustration, Fig. 1$^a$ showing the lower half and Fig. 1$^b$ the upper half of the apparatus. Figs. 2 and 2$^a$ show a front view of the apparatus, also broken in two, Fig. 2 being the lower half of the apparatus and Fig. 2$^a$ the upper half. Fig 2$^b$ shows an elevation of an addition-disk. Fig. 2$^c$ shows a section of Fig. 2$^b$. Fig. 4 shows a longitudinal section, on an enlarged scale, of the rear portion of the apparatus. Fig. 4$^a$ shows a front view of two addition-disks. Fig. 4$^b$ shows a plan view of the rear portion of the apparatus as shown in elevation in Fig. 4 and on the same scale. Fig. 5$^a$ shows a plan of the parts shown in Fig. 5. Fig. 5$^b$ shows a section and elevation of a practicable form of an addition-disk.

Figures 4, 4A:
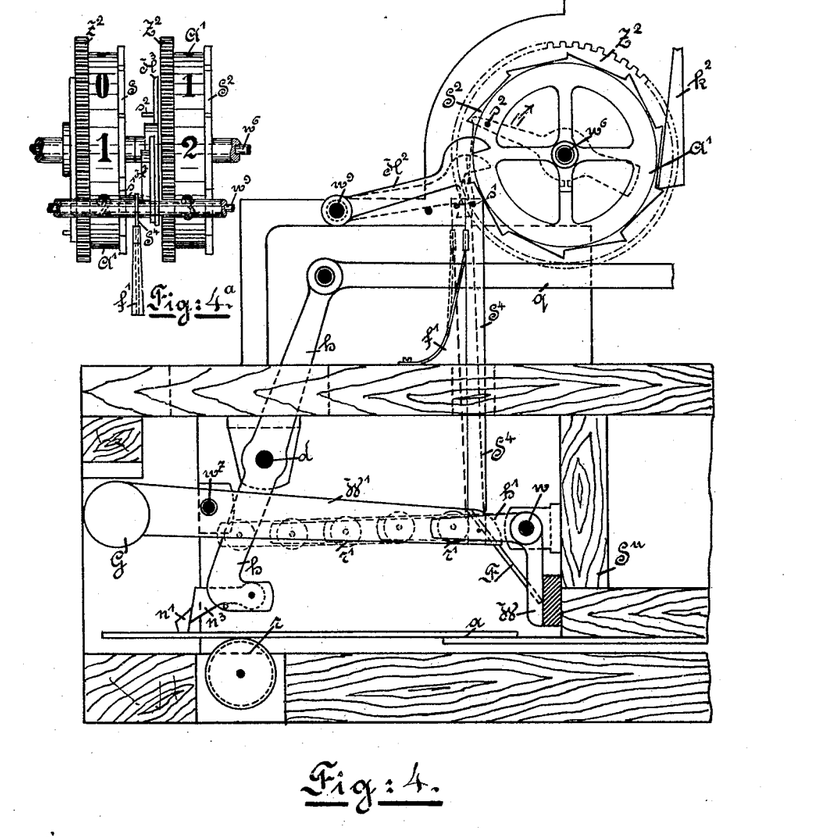

The base upon which the apparatus is mounted contains a drawer S$^u$ for holding the money which is paid in during the day. This drawer S$^u$ does not reach to the end of the lower frame, but leaves at the back a free space, which may be utilized for various devices. At the back of the drawer S$^u$ there is placed a shaft $w$, passing through the space in a transverse direction, upon which shaft revolve loosely five angle-levers W, (see Figs. 4 and 4$^b$,) and which, together with the lever W', provided with counterweight G, are utilized for aiding in the manipulation of the adding mechanism.

Upon the work-plate of the apparatus are arranged four (more or less) grooved bars $s$, on which work (four) racks Z, each supported by rollers R. The said racks Z are themselves in connection with gear-wheels Z', which revolve loosely upon the shaft $w'$.

Figure 1:
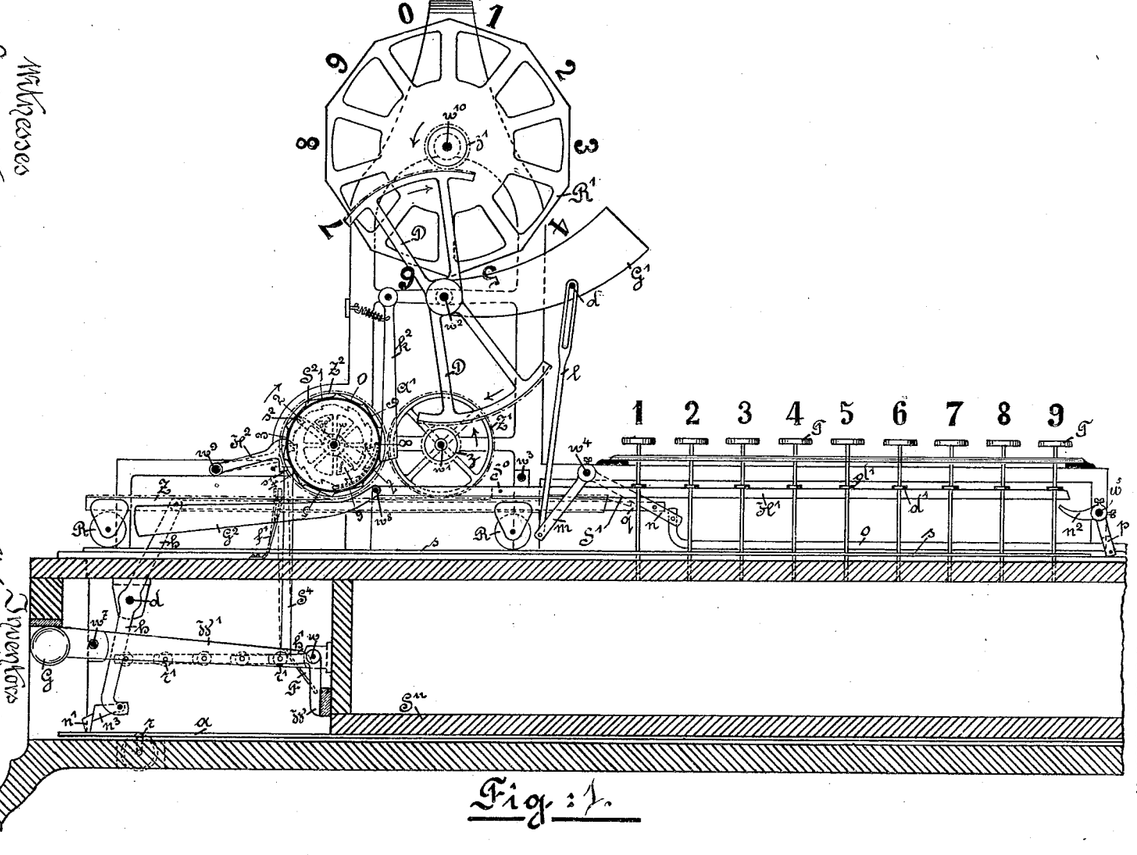
Figure 1 shows a longitudinal section, partly broken away, of the complete apparatus.
Figure 1A:
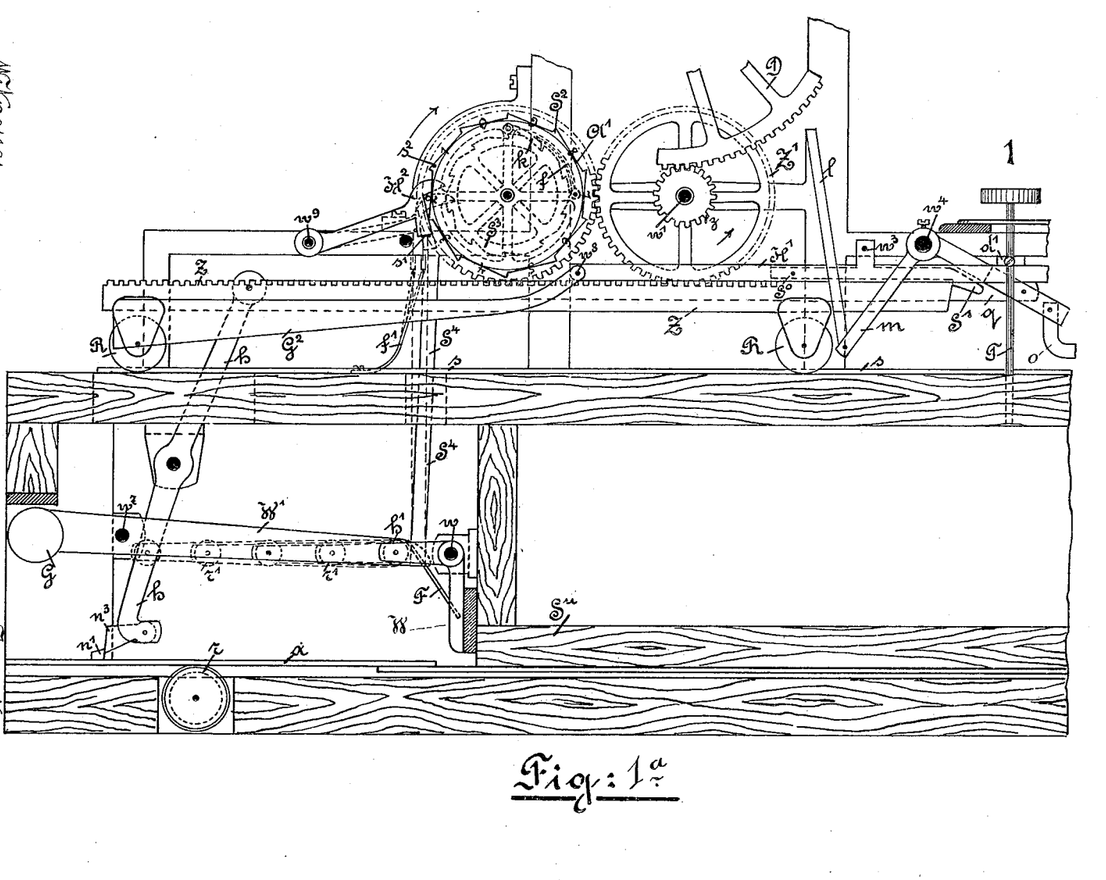
Figure 1B:
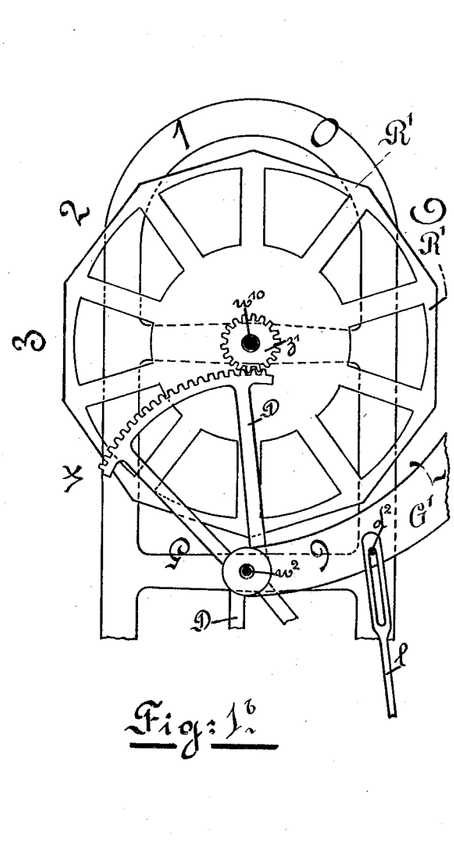
Figures 2, 2B, 2C:
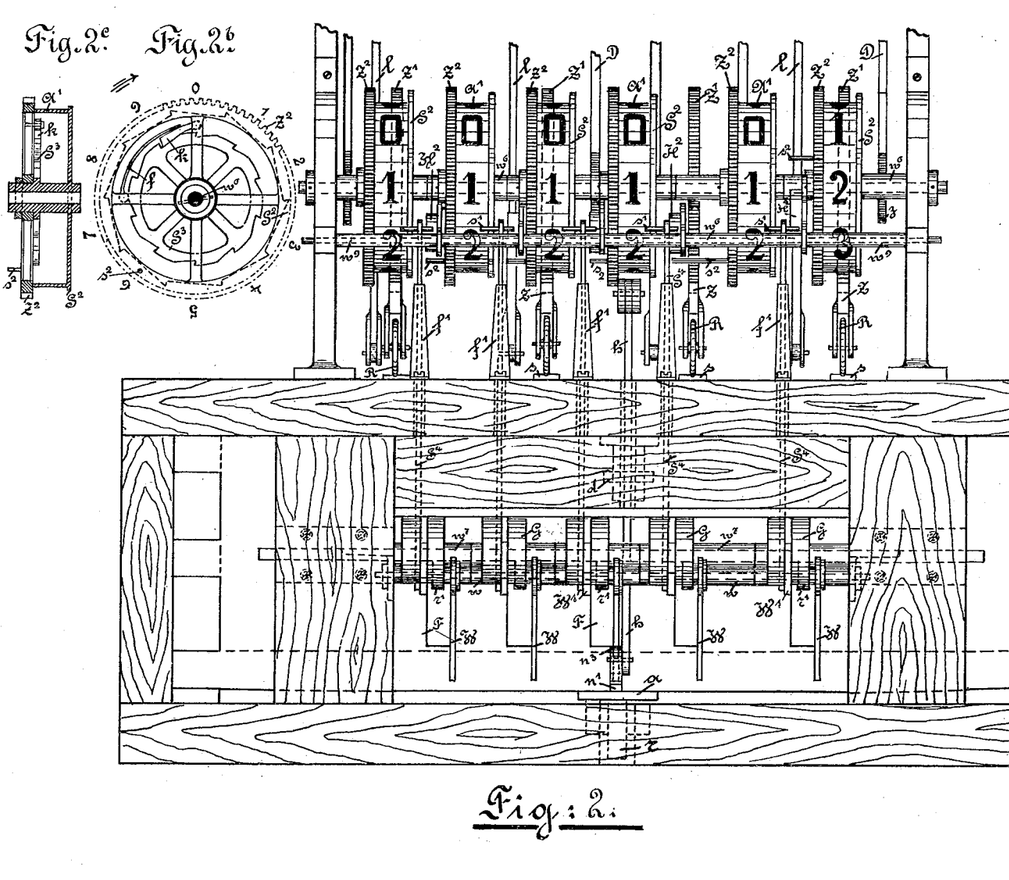
Figure 2A:
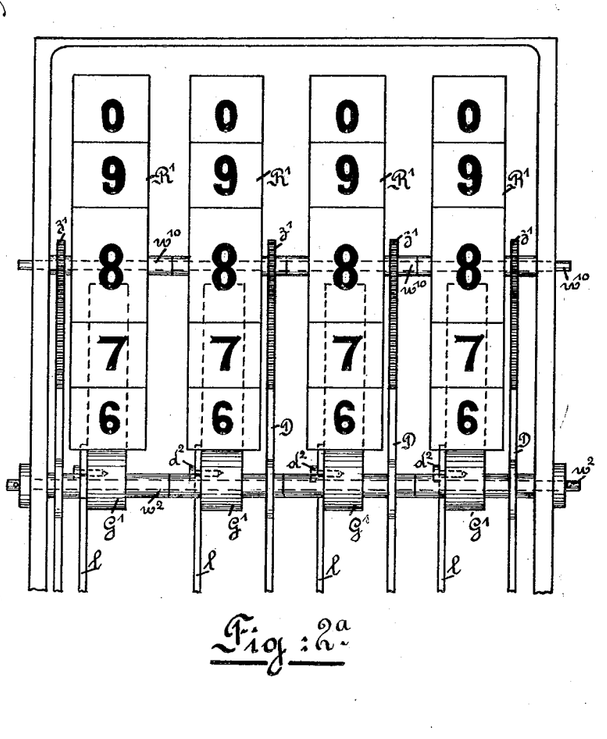

The check-till mechanism illustrated in the drawings, which is designed for French money, possesses four rows or sets of keys corresponding to the above-mentioned four racks Z. By means of the first of these four rows the single centimes may be indicated up to nine centimes, with the second row the tens, twenties, thirties, &c., and the third and fourth rows are arranged in the like manner for the francs paid in. Each row consists of nine keys T, so that by means of the check-till illustrated the highest amount which can be indicated at one time for any single transaction or payment is ninety-nine francs and ninety-nine centimes, as there are only four indicating-wheels R', each indicating from "0" to "9." Weights G', Figs. 1 and 1$^b$, serve as the motive power or automatic driving means and are in one piece with the toothed double sectors D. The latter revolve loosely upon the fixed shaft $w^2$, upon which they are placed consecutively, and cannot become displaced in the axial direction. When the apparatus is not in use, and consequently when all the figure-wheels indicate zero, then all the racks Z are in their rearmost positions and are held in such positions by the overlapping noses of latches S', pivoted at S° on the side of levers H' and suspended movably upon a shaft $w^3$. The noses of latches S' drop over the forward ends of the racks, as shown in Fig. 1ᵃ.

Figure 5:
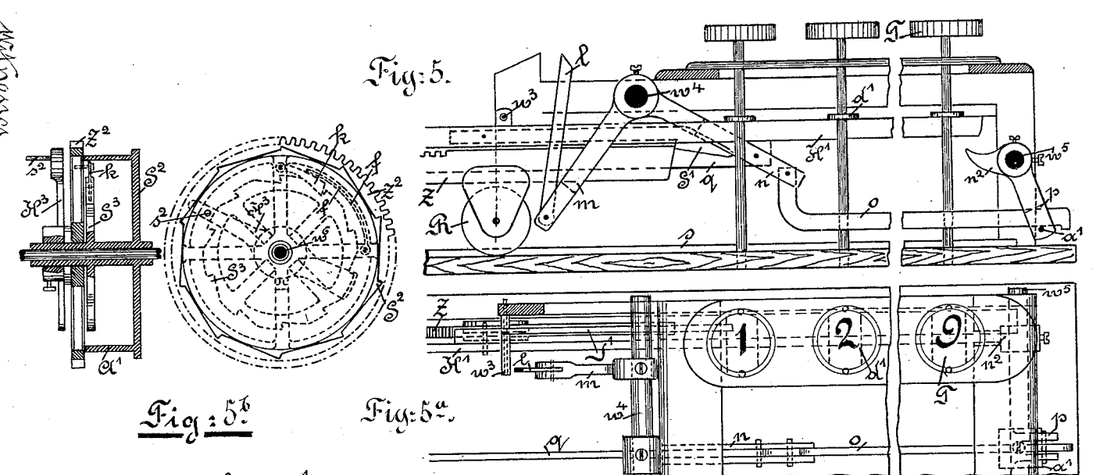
Fig. 5 shows a longitudinal section of the forward part of the apparatus on an enlarged scale.

In order to cause the figure-wheels R', provided with figures from "0" to "9" and which revolve independently of one another upon the fixed shaft $w^{10}$, to adjust themselves automatically according to the key touched in order to indicate a desired figure, the racks Z corresponding to the same must first be released. This is effected by the action of the keys T upon the levers H', pivoted at $w^8$, so that when the keys are pressed down shoulders $d'$ thereon move the forward ends of the levers H' downward, thus depressing the rear ends of the latches S', while the front ends of the same, which held the racks Z, are thereby raised. After the release in this manner of the racks Z the weights G', which constitute the driving means for the figure-wheels and adding devices in this instance, swing down on their shafts or pivots $w^2$ and set the mechanism in action, and they compel the toothed double sectors D, fixed singly with them each upon a sleeve, to make a swinging motion, by which the wheels $z$ $z'$, gearing in the said toothed sectors, are caused to revolve. Of these last-mentioned wheels, $z'$ rotates the figure-wheels R' and $z$ rotates the toothed wheels Z', which serve to propel the racks Z, (and both simultaneously,) the rotation being continued in opposite directions until the released racks Z have come in contact in their forward motion with the shoulders of the keys T and are thus stopped. The counting-wheel will then have been revolved so far as will correspond to the depression of the corresponding key and upon standing still will indicate the requisite number. In order to restore the number-wheel R' and the rack Z to their initial positions and at the same time to raise the depressed key T, it is only necessary to pull out the drawer Sᵘ. Upon the bottom of this drawer Sᵘ, at the rear thereof, there is fixed a flat iron bar $a$, which rests on a roller $r$, placed in the bottom of the frame and carries upon its rear end a projection $n'$. When the drawer Sᵘ is pulled out, this projection $n'$ engages the double lever $h$, which is pivoted to the rear end of the bar $q$ and serves to reciprocate the same. The bar $q$ is pivoted at its forward end (see Fig. 5) to the lever-arm $n$, fixed upon the movable shaft $w^4$. As soon as the drawer Sᵘ has been pulled out sufficiently far the projection or catch $n^3$ of the double lever $h$ slips over the projection $n'$ and the lever falls back again, and upon the subsequent closing of the drawer Sᵘ the projection $n'$ raises the catch $n^3$ and then places itself behind the same in the position shown in Fig. 1 in order again to engage the double lever $h$ upon the next opening of the drawer.

The shaft $w^4$ bears, in addition to the lever-arm $n$, as many levers $m$ as there are figure-wheels, and these levers are pivoted to the bars $l$. The bars $l$ are each provided with a longitudinal slot, into which pins $d$ on the weights G' enter, by which means the weights G' are raised. The lever-arm $n$ is forked in front in order to take up in addition to the bar $q$ also the bar $o$, bent at an angle, which bar reaches to the forward end of the apparatus and is there bent downward in the form of a hook, Fig. 5.

The shaft $w^5$ passes laterally through the descending supports of the side pieces of the frame at the front end of the apparatus and bears the downwardly-projecting forked lever-arm $p$ (the fork of which, however, is closed below by means of the pin $a'$) and the inwardly-extending small curved levers $n^2$. The bar $o$ passes through the forked lever $p$, (see Fig. 5,) and the hook of the said bar, which is bent downward can engage the pin $a'$ when the bar $o$ is retracted. The bent levers $n^2$ are so located along the shaft $w^5$ as to lie each under one of the large levers H', placed below the keys T, and act to restore the same to the raised position when moved by the levers $n^2$.

Figure 3:
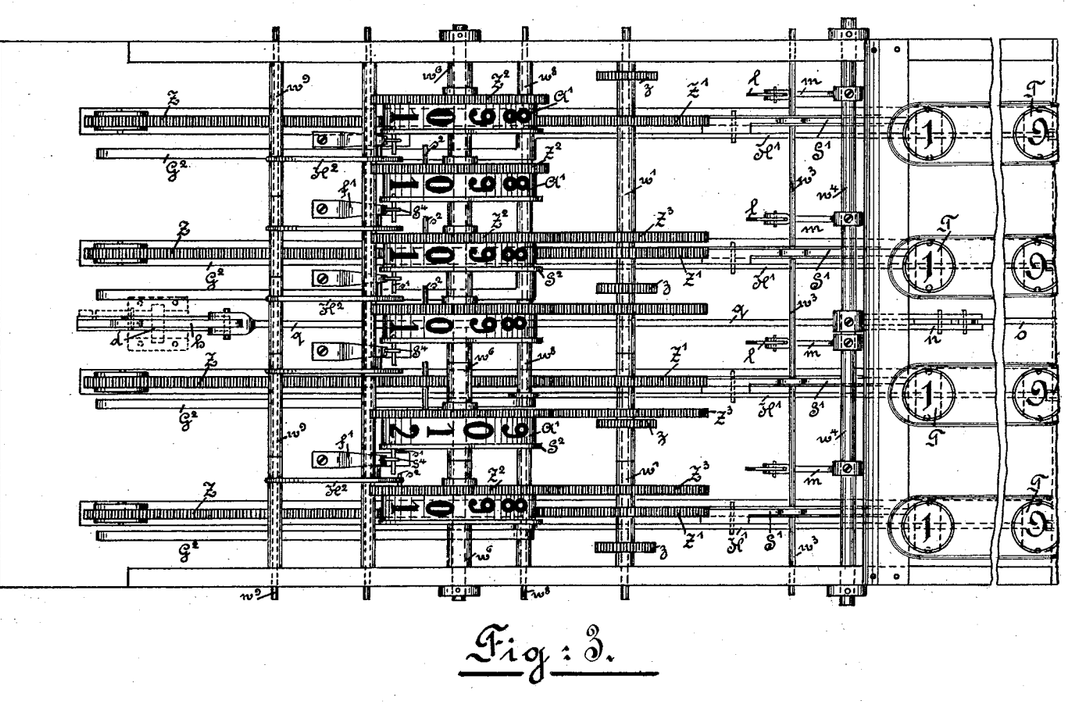
Fig. 3 is a plan view, partly broken away, of the complete apparatus.

As may be seen in Fig. 3, the lever $h$, the bars $q$ and $o$, and also the lever $p$, which is operated by $o$, are placed in the middle of the width of the apparatus, whereas the levers and bars $m$, $l$, and $n^2$ are provided in the same number as there are rows of keys. Consequently if after a given indication the figure-wheels, as well as the keys and the racks—that is to say, the whole apparatus—are again to be made ready for a fresh indication it is requisite to open the drawer Sᵘ, as already stated. By this means the lower end of the double lever $h$ is pulled forward, the bar $q$ retracted, and by the aid of the lever $n$, secured thereto, the bar $o$ is retracted and at the same time the lever $m$ is swung, thereby lifting its bar $l$ to restore the weight G', and the bent levers $n^2$ upon the shaft $w^5$ are raised to raise the forward ends of the levers H' to restore the depressed keys. When a weight G' is raised, the toothed double sector D, which is in one piece with the weight G', makes its revolving motion backward in the opposite direction to that already explained, thereby rotating the toothed wheels $z$ $z'$ and the wheels Z', thereby restoring the racks Z and the figure-wheels R', fixed upon the shaft $w^{10}$, to their initial positions. At the same time the latches S', pivoted to the levers H' and S⁰ and swinging on shaft $w^3$, drop and lock the racks Z, thus holding the whole mechanism fast.

In order that the figures indicated consecutively upon the figure-wheels R' may be added together continuously, a device is provided which consists, essentially, of a fixed shaft $w^6$, on which the various addition-disks A' are loosely placed and are revolved singly in their order. These addition devices or disks A' (see Figs. 2ᵇ, 6, 6ᵃ, and 6ᵇ) are hollow and are provided on one side with a closed bottom, which has ten ratchet-teeth projecting over the diameter of the counting-drum, and which bottom is formed in this manner as a driving-wheel S². In the interior of each drum there is placed a stop-wheel S³, also provided with ten teeth, which wheel is firmly connected with the separate drums, and consequently takes part in their motion. Upon the open side of the addition-disks A' and upon the prolonged hub thereof tooth-wheels Z² are hung so as to revolve loosely. On one spoke of these tooth-wheels Z² a pawl $k$ is pivoted, upon which a spring $f$ presses continuously, which spring is secured to another spoke of the same wheel. The said pawl rests upon the stop-wheel S³. Further, there is attached at the side to the tooth-wheels Z² a pin $s^2$, which upon each full revolution of the addition-disk A' releases a catch H² or locking device for the supplemental driving means for the adding devices in the manner hereinafter described. By means of this arrangment of the tooth-wheel Z² and of the stop-wheel S³ the first is enabled to revolve in both directions; but the addition-disk A' and stop-wheel can move with the wheel Z² in the one direction only. The amounts indicated by the figure-wheels R', which correspond to the motions thereof, are conveyed to the addition-disks A' by the toothed sector D, which, engaging in the toothed wheels $z'$, revolves the figure-wheels R' and at the same time revolves the wheels $z$, Z', and Z³, which are fixed upon a common sleeve (see Fig. 3) on the shaft $w'$, the wheel Z³ being in gear with the wheel Z². After each full revolution of such an addition-disk the addition thereof must be conveyed to the next following disk. This is effected upon the opening of the drawer S$^u$, which is shorter than the base of the apparatus. At the back of the drawer there is located for this purpose a transverse shaft $w$, upon which swing, as already stated, five angle-levers W, (see Figs. 1, 1$^a$, 4, and 4$^b$,) which are independent of each other, the free lever-arms $h'$ whereof carry little rollers $r'$. Moreover, there is attached to the frame of the apparatus another shaft $w^7$, on which revolve a corresponding number of levers W', each provided with a counterweight G and with a plane F. The said planes F are attached to the front end of the said levers W' on one side in such manner that upon the drawer S$^u$ being pulled out the rollers $r'$ will slide under the said planes, lifting them up, together with the bars S⁴. At the place at which the planes F of the levers W' are placed there are also connected therewith, by means of hinges, the bars S⁴, against which springs $f'$, secured upon the base-plate, press, while through the upper end of each bar S⁴ a pin $s'$ is passed crosswise. (See Fig. 4$^a$.) These bars S⁴ coöperate with the teeth of the wheel S² and constitute actuating means for driving the elements A' S² of the adding mechanism. Upon the connecting-shaft $w^9$, connecting the side frame-pieces of the apparatus, there are another loosely and revolubly mounted catches H², which correspond in number to the bars S⁴, which catches usually assume the position indicated and hold the pins $s'$ of the bars S⁴, (see Fig. 6,) thereby normally holding the bars S⁴ free from contact with ratchet S², so that they will be inoperative to operate the adding device until released by the catch H², so as to be thereby adapted for engaging the wheel S².

Figure 6:
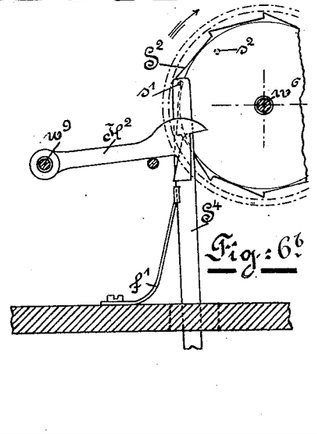
Figs. 6, 6$^a$, and 6$^b$ are separate views of the rotating mechanism of the addition-disks and illustrate the mechanism in different positions.

By the drawing out of the drawer S$^u$ the rollers $r'$, secured to the free arms $h'$ of the angle-levers W, pass under the inclined planes F. The levers W' and the bars S⁴ are thereby consecutively raised and the pins $s'$ passed through the same strike (when they are liberated from the catches H²) against a tooth of the wheel S², and thereby turn the addition-disks correspondingly. In order to release the bars S⁴ and the pins $s'$, a pin $s^2$, fixed at the side of each addition-disk, raises after each full revolution that catch H² which holds fast the pins $s'$ of the bar S⁴ belonging to the next addition-disk, so that this next disk is thereby liberated and the bar S⁴, under the influence of the spring $f'$, is moved forward, and consequently the pin $s'$ stands under a tooth of the wheel S². Upon the opening of the drawer S$^u$ the pin $s'$ which passes through the upper end of the bar S⁴ strikes against the tooth of the wheel S² with which it coöperates, and thereby revolves the addition-disk one figure farther, whereupon the pin $s'$ slips down behind the catch H² and is again held by the same until the moving addition-disk has again completed a full revolution and releases it. This will be understood by referring to Figs. 6, 6$^a$, and 6$^b$. Let A' represent the addition-disk for the "tens" and $s^2$ the pin on the adjacent addition-disk of the "units," (this disk being removed in the drawings for clearness.) In Fig. 6 the bar S⁴ is shown held back from the wheel S² by the catch H², which engages over the pin $s'$. The bar S⁴ cannot, therefore, engage the wheel S² in rising. On the adjacent addition-disk (for the units) completing one revolution, (by the gearing Z³ Z² in the manner hereinbefore described,) which represents ten units, the pin $s^2$ which is fixed on the side of the said adjacent units-disk will have been carried up by the said disk, thus raising the catch H² and releasing the bar S⁴, which latter then springs against the wheel S² under the impulse of the spring $f'$, as shown in Fig. 6$^a$. The catch H² then slips off the pin $s^2$ and returns to its initial position, and on the bar S⁴ being raised by the pulling out of the drawer (as before described) the wheel S² and the tens-disk A' are rotated one step, (one figure,) as shown in Fig. 6$^b$. When the bar S⁴ drops again, its pin $s'$ slides along the back of a tooth of the wheel S² and then along a wedge-shaped projection (shown dotted on the far side of the catch H²) until it again lies behind the said catch in the position shown in Fig. 6, ready to repeat the operation upon another ten units being indicated by the units-disk, in order to carry said amount to the tens-disk, as just described. In this manner the additions of each disk after the same has made a revolution are transferred to the following one and the first disk recommences its addition.

The check-till illustrated in the accompanying drawings will add up to an aggregate of 9,999.99 francs, as there are six addition-disks A'.

The apparatus can obviously be adapted for larger or smaller indications and additions, as also for every desired monetary system.

The mode of operation of the whole apparatus is as follows: As soon as the person making use of the check-till receives money from a customer he presses down the keys corresponding to the amount paid in, whereupon the amount is visibly indicated to the customer by means of the figure-wheels R' in the manner already described. The tooth-wheels Z', which move the racks Z, are placed, together with the tooth-wheels $Z^3$, which move the addition-disks corresponding to the key-rows, upon a common sleeve, so that the corresponding addition-disks A' are revolved simultaneously with the figure-wheels R', only with the difference that upon the opening of the drawer $S^{11}$ the latter again return to zero, while the former remain standing in the position into which they have been moved. Upon the opening of the drawer $S^{11}$ the person who receives the money places the same therein, upon which the indicated figure disappears and the apparatus is again ready to indicate another number. By the drawing out of the drawer $S^{11}$ the decimal transfer arrangement for the addition is actuated in the manner above described, so that at the end of the day the sum of all the amounts hitherto indicated may be read upon the addition-disks in a straight line.

I claim—

1. In a device of the character described, the combination of keys T, pivoted levers H' common to several of said keys located beneath and operated directly by said keys, latches S' pivoted to said levers H', racks Z directly engaged by said latches and normally held in fixed positions thereby, the said racks being liberated by the action of said levers H' releasing the latches and automatically-actuated gear-wheels Z' for moving said racks forward until they are arrested by the keys T which happen to be pressed down at the time, substantially as and for the purpose specified.

2. In a cash-register or like machine, the combination of a series of keys, a series of reciprocating racks adapted to have their extents of movement limited by contact with the said keys, a series of figure-wheels and adding devices governed by the movement of a rack, a single common automatic driving means for driving each set of figure-wheels, adding devices and racks, a catch or detent device operated by a key to release the mechanism set forth and supplemental means as $S^4$ operated by the movement of the drawer to give motion to elements of the adding device and locking means coöperating therewith to lock the said supplemental means out of action until an element of the adding device makes a complete rotation and releases the locking means.

3. In a cash-register or like device, the combination of a plurality of oscillating racks, an adding device and a figure-display device or wheel actuated by each rack, a series of keys for each rack adapted to arrest the rack in several predetermined positions, latches for the racks for holding the same in a fixed position and a universal lever H' common to a series of keys and adapted to be depressed thereby to release the said latch.

4. In a cash-register, the combination of a series of oscillating racks, an adding device and figure-display device operated by each rack, a series of keys for each rack with which the said rack comes in contact when the same are depressed, a universal lever located beneath each series of keys adapted to be depressed thereby, a pivoted latch operated by the said lever for holding the rack in its initial position and a device for restoring the depressed key operated by the movement of the cash-drawer.

5. In a cash-register or like device, the combination of a series of racks with key-operated releasing and arresting means, adding devices operated by the racks and a longitudinally-moving rod or pusher $S^4$ operated by the cash-drawer to effect the transfer of an amount from an adding device of a lower to a higher denomination, a pivoted latch $H^2$ normally causing the pusher $S^4$ to make an idle oscillation and means carried by the adding device of lower denomination for tripping the latch $H^2$ to permit the oscillating pusher to reach contact with the adding device of a higher denomination.

6. In a cash-register, the combination of oscillating racks, figure-wheels and adding devices operated by the said racks, a weight adapted to give motion to the figure-wheels, adding devices and racks, pivoted latches adapted to release the racks, means for operating the said pivoted latches common to a series of keys, the said keys being provided with means for arresting the racks by direct contact therewith and restoring devices for the figure-wheels, racks and keys, comprising in their structure the pivoted levers $m$ $n$, one of which is connected to a pivoted lever $h$ operated by the cash-drawer, one of the said levers being connected to means for restoring the weight to position and the other of the said levers being connected to means for restoring the keys to position, the restoring of the weight to position being effective to restore the rack.

7. In a cash-register, the combination of an oscillating rack, an adding device and figure-wheel operated thereby, a series of keys each carrying means with which the rack comes in contact when a key is depressed and a pivoted lever H' extending beneath the series of keys and operable by any key of the series, the said lever being counterbalanced and provided with a latch adapted to hold the rack in its initial position.

8. In a cash-register, the combination of an oscillating rack, an adding device and figure-wheel operated thereby, a series of keys each carrying means with which the rack comes in contact when a key is depressed and a pivoted lever H' extending beneath the series of keys and operable by any key of the series, the said lever being counterbalanced and provided with a latch adapted to hold the rack in its initial position, a cash-drawer, a longitudinally-moving pusher or rod $S^4$ operating to transfer an amount from one adding device to another and a latch $H^2$ adapted to normally hold the pusher out of engagement with the adding device and means for tripping the said latch to permit the pusher to operate the adding device.

RICHARD HENNING.
JOSEPH PALLWEBER.

Witnesses:
CHRISTIAN GEISS,
JEAN GRUND.